July 7, 1925.  1,544,621
G. A. WIDMANN
CLUTCH MECHANISM
Filed Jan. 26, 1925   2 Sheets-Sheet 1
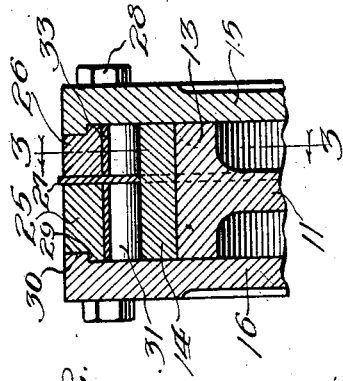
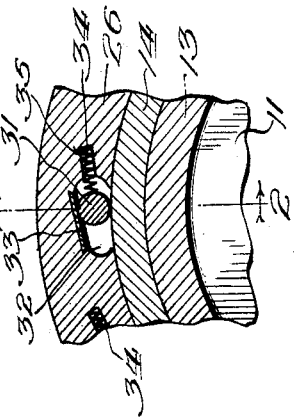
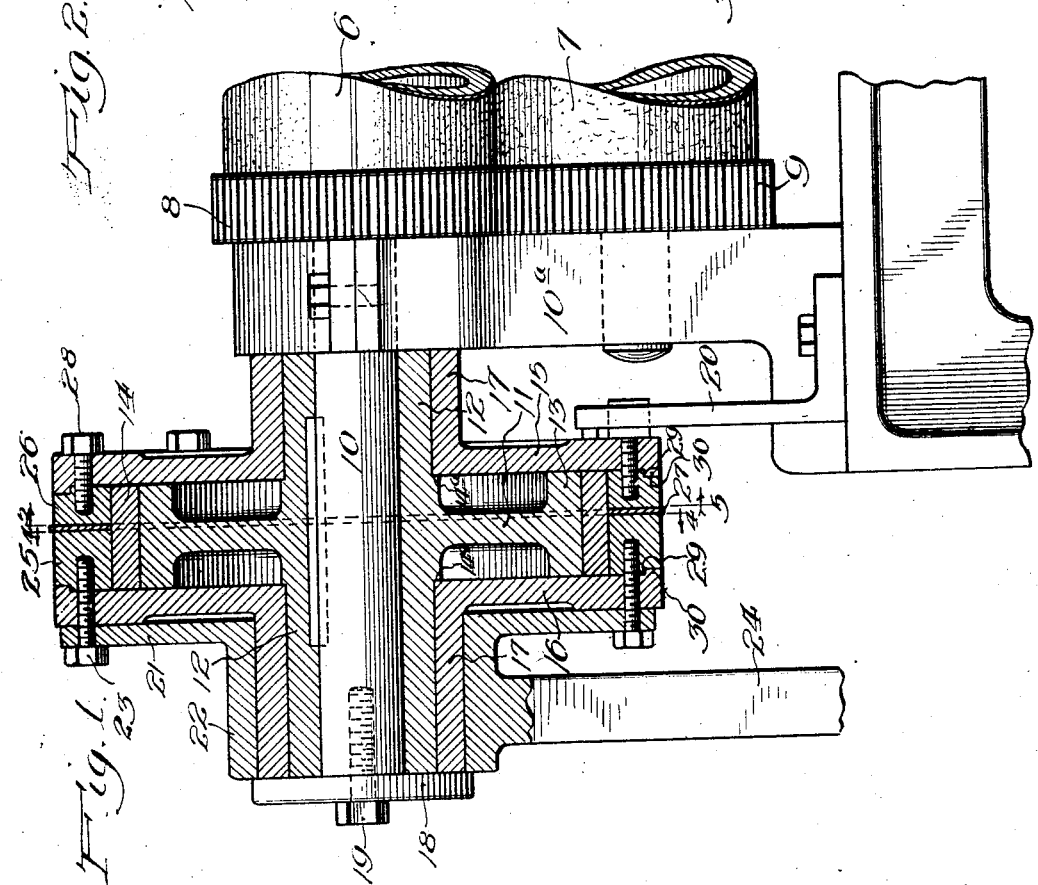
Inventor:
Gustav A. Widmann,
by
Attys.

July 7, 1925.

G. A. WIDMANN 1,544,621

CLUTCH MECHANISM

Filed Jan. 26, 1925

Inventor:
Gustav A. Widmann

Patented July 7, 1925.

1,544,621

UNITED STATES PATENT OFFICE.

GUSTAV A. WIDMANN, OF CHICAGO, ILLINOIS.

CLUTCH MECHANISM.

Application filed January 26, 1925. Serial No. 4,783.

*To all whom it may concern:*

Be it known that I, GUSTAV A. WIDMANN, a citizen of the United States, residing at Chicago, in the county of Cook and State of Illinois, have invented certain new and useful Improvements in a Clutch Mechanism, of which the following is a specification.

This invention relates to a clutch mechanism adapted for use where a rotary intermittent feed movement is desired. More particularly it is concerned with certain improvements designed to meet very exacting conditions which demand the avoidance of any slip movements. Such a clutch mechanism may be operated to advantage in many capacities, but the one hereinafter to be considered, primarily for the sake of convenience, is in connection with the manufacture of gill nets.

An embodiment of my invention in a preferred form is shown in the accompanying drawings wherein—

Figure 1 is an axial section through the clutch mechanism, certain parts associated therewith being exhibited in elevation;

Fig. 2 is a fragmentary section taken approximately on line 2—2 of Fig. 3;

Fig. 3 is also a fragmentary section taken on line 3—3 of Fig. 2; and

Figs. 4 and 5 are vertical sections taken on lines 4—4 and 5—5, respectively, of Fig. 1.

I have shown in the drawings one end of a pair of rollers 6 and 7, one being covered with felt and the other with emery. A construction such as this is commonly employed in the making of gill nets, the rollers being gear connected as at 8 and 9, whereby they are revolved together and oppositely. Associated with one of these rollers is a shaft 10 rotatably mounted within a suitable bearing which is carried upon a bracket 10ª. The clutch mechanism of the present invention employs a plurality of pallets and pawls designed to operate alternately upon this shaft so as to impart thereto an intermittent feed movement. The gill net machine parts just referred to have nothing special to do with this invention, but have been shown and described primarily in furtherance of a better understanding thereof.

Mounted fast on the shaft 10 is a wheel 11 having an elongated hub 12 which extends laterally in opposite directions for an appreciable distance. The wheel rim 13 is surrounded by a band 14 which may be shrunk thereon, the same being preferably formed of soft machine steel. Formed on the wheel hub is a pair of oppositely facing shoulders 14ª which are aligned with the sides of the band 14, as shown, and upon opposite sides of the wheel I mount a pair of plates 15 and 16, each being provided with a laterally disposed hub 17 which extends away from the other to fit over the wheel hub 12. Preferably the ends of the two plate hubs align with the ends of the wheel hub, as shown. A cap 18 which is secured to the shaft end, as by means of a bolt 19, serves to retain these parts in a fixedly assembled relation. The plate 15 which lies inwardly of the other is connected with an arm 20 extending from a stationary part of the machine so as to be held against movement. It is of advantage to this invention that the two plates and wheel should have some such mounting as has been described for the reason that these parts are thereby centered true and accurately relative to each other, irrespective of whether or not the wheel remains accurately centered on the shaft 10.

With the outer plate 16, I associate a spider plate 21 having a hub 22 which overlies the proximate plate hub 17, the cap 18 serving also, if desired, to hold the spider plate in position. By means of bolts 23 of which there may be several, the spider plate is connected fast to the plate 16. Projecting radially from the spider plate is a crank arm 24 adapted to be reciprocated through the medium of a pitman or other instrumentality, not shown. Manifestly any such movements are communicated to the plate 16 through the bolt connections 23 just referred to.

Surrounding the band 14 are two rings 25 and 26, hereinafter termed, respectively, the "pallet" and "pawl" rings. A separating ring 27 is interposed therebetween for reasons which will presently appear. The pallet ring 25 which is carried by the plate 16 may be secured thereto with the aid of the same bolts 23 which hold the spider plate in place. The pawl ring 26 may be secured to its associated plate 15 through the medium of other bolts 28, as shown. Both of these rings are, by preference, formed with annular seats 29 wherein may be accommodated a marginal flange 30 which extends inwardly from the associated plate 15 or 16.

The present clutch mechanism includes also a plurality of rollers 31 which are retained within suitable slots 32 formed in the two rings 25 and 26. Those rollers which are associated with the ring 25 serve as pallets, whereas those in the other ring act as pawls. Each of the slots 32 which extends across the ring from side to side is so located relative to its inner face as to open out upon the band 14 with which the ring is engaged. Inserted within the slot face opposite thereto, which is inclined slightly so as to present one end thereof closer to the band than the other, is a plate 33, preferably of tempered spring steel. Each pallet or pawl is movable lengthwise of its slot to engage the plate 33 and band 14 with an increasing pressure, whereby a driving or braking relationship is established. In furtherance of this, I may also employ a spring 34 which is entered within a pocket 35 extending laterally from the larger end of the slot, the spring tending to hold its associated roller in position for instant action. The slots in the pallet ring 25 are preferably more numerous than those in the pawl ring 26, and the two sets of slots are oppositely inclined, whereby the rollers in one ring act to drive, and those in the other to hold, the wheel 11. It follows from this that the pallets function promptly so as to prevent any reverse movement of the wheel whenever the oscillatory plate 21 starts upon the reverse stroke of its movement cycle.

It is evident that movements of the pallet ring will communicate an intermittent rotary feed to the wheel 11, the two machine rollers 6 and 7 being thereby operated as desired. During such feeding movements, the pawls in the fixed ring act to prevent any reverse movement, however slight, of the shaft 10 and parts connected therewith.

It is because of such features of construction that I am enabled to start and stop the rotary feed of the wheel 11, and parts driven therefrom, with a minimum of slip, the spring actuated rollers being so held as to grip the engaging surfaces without delay.

The mechanism, as above described, can be employed to advantage in many different capacities. I am not so much concerned with the details of any drive to a gill net machine as with the essential parts of the present clutch mechanism, the same including a driven wheel and a pair of rings having pallet and pawl clutch elements oppositely disposed so as to produce an instant response under oscillations.

I claim:

1. In a clutch mechanism, the combination with a driven shaft of a wheel mounted fast thereon, a pair of plates one adjacent each wheel side, means whereby each plate is centered with respect to the wheel, means whereby one plate is fixedly held against movement, means for oscillating the other plate, a pallet ring surrounding the wheel and connected fast to the oscillating plate, a pawl ring also surrounding the wheel and connected fast with the fixed plate, a separating ring between the two rings last named, and two sets of clutch elements, one associated with each of the two rings last named, adapted alternately to engage operatively with the wheel whereby the same is started and stopped in response to movements of the oscillating plate, substantially as described.

2. In a clutch mechanism, the combination with a driven shaft, of a wheel mounted fast thereon, the wheel being provided with an elongated hub extending in opposite directions therefrom, two plates each mounted on the wheel hub and adapted one to rest against either side thereof, means for oscillating one plate, other means for holding the other plate fixedly against movement, a pallet mechanism connected fast with the oscillating plate, and a pawl mechanism connected fast with the fixed plate, each adapted for alternate operative engagement with the wheel whereby the shaft is started and stopped in response to movements of the oscillating plate, substantially as described.

3. In a clutch mechanism, the combination with a driven shaft, of a wheel mounted fast thereon, two rings closely surrounding the wheel, means for holding one ring stationary, means for oscillating the other ring, there being formed in each ring a plurality of transversely extending slots, each open upon the inner ring face and having its side opposite thereto inclined whereby one slot end is closer to the wheel than the other, a roller mounted in each of the several slots, and spring means bearing against each roller tending to move the same along the wheel toward the narrow end of the slot with an increasing wedge pressure, the direction of inclination of the slots in one ring being opposite to those in the other, whereby the rollers in one ring serve as pallets and those in the other as pawls, substantially as described.

4. In a clutch mechanism, the combination with a driven shaft, of a wheel mounted fast thereon, a pair of rings closely surrounding the wheel, each ring being provided with a plurality of transversely extending slots which open upon the inner face thereof, the slot wall opposite such open face being inclined to present one end thereof closer to the wheel than the other, the direction of inclination of the slots in one ring being opposite to those in the other, a roller positioned within each slot, a separating ring between the two roller rings acting to confine the rollers therewithin against endwise movement toward each other, and a pair of plates associated with the wheel, one stationary and the other rotatable independently thereof, each plate being connected fast with the proximate ring, the two plates serving to confine the rollers against endwise movement away from each other, substantially as described.

5. In a clutch mechanism, the combination with a driven shaft, of a wheel carried fast thereby, a pair of plates one adjacent each wheel side, means whereby each plate is maintained in concentric relation with the wheel, a pair of rings between the two plates each closely surrounding the wheel, co-operating means on each ring and plate proximate thereto for holding the ring against radial displacement, means adapted to connect each ring fast to its associated plate, means whereby one plate is held fixedly against movement, means for oscillating the other plate, and mountings in each ring for a plurality of clutch elements, those in the oscillating ring being pallets and those in the fixed ring being pawls, all such elements being adapted to engage operatively with the wheel rim to start and stop the same in response to movements of the oscillatory plate, substantially as described.

6. In a clutch mechanism, the combination with a driven shaft, of a wheel carried fast thereby, the wheel being provided with an elongated hub extending in opposite directions, a band surrounding the wheel and secured fast thereto, a pair of shoulders on the wheel hub one in alignment with each side of the band, a pair of plates arranged on opposite sides of the wheel, each plate being adapted to seat adjacent the wheel band and shoulder, means for holding one plate stationary against movement, means for oscillating the other plate, each plate being provided with an inwardly extending marginal flange, a separating ring surrounding the band, and two clutch rings also surrounding the band one on each side of the separating ring and each engageable by the inwardly extending flange of the proximate plate, means for connecting fast each clutch ring to the proximate plate, and clutch elements mounted in each plate in operative relation to the wheel and adapted for alternate operative engagement therewith whereby the wheel is started and stopped in response to movements of the oscillatory plate, substantially as described.

7. In a clutch mechanism, the combination with a driven shaft, of a wheel carried fast thereby, a pair of rings side by side closely surrounding the wheel, there being formed in each ring a plurality of slots each open on the inner ring side, the slot wall opposite such face being inclined so as to lie closer to the wheel at one slot end than the other, the direction of inclination of such walls being opposite in the two rings, a roller mounted within each slot and adapted to wedgingly engage the wheel rim, means for holding one ring fast, and other means for oscillating the other ring and a mounting on the wheel for each of said last named means, substantially as described.

8. In a clutch mechanism, the combination with a driven shaft, of a wheel carried fast thereby, a plurality of pallets and pawls disposed to the outside of the wheel in a manner to engage with the rim thereof, a pair of mountings, one for the pallets and the other for the pawls, wherein these parts may be moved into wedging engagement with the wheel rim, the faces which produce such wedging engagement of the pallets and pawls being reversely inclined in the two mountings whereby the wheel is alternately started and stopped in response to intermittent rotation of the pallet mounting, substantially as described.

9. In a clutch mechanism, the combination with a driven wheel, of two rings side by side surrounding the rim thereof, a plurality of spring actuated pallets mounted in one ring, and a plurality of spring actuated pawls mounted in the other ring, all of the pallets and pawls being in engagement with the wheel rim, there being for each pallet and pawl a wedge face in the associated ring so inclined as to assure an immediate clutching with the wheel when the pallet ring is moved in either direction, and the number of such pallets being in excess of the pawls, substantially as described.

10. In a clutch mechanism, the combination with a driven wheel, of two rings side by side surrounding the rim thereof, a mounting for each ring on the wheel hub, a plurality of spring actuated pallets mounted in one ring and a plurality of spring actuated pawls mounted in the other ring, all of the pallets and pawls being in engagement with the wheel rim, there being for each pallet and pawl a wedge face in the associated ring so inclined as to assure an immediate clutching with the wheel rim when the pallet ring is moved in either direction, substantially as described.

GUSTAV A. WIDMANN.

Witness:
EPHRAIM BANNING.